March 25, 1969     F. D. F. TALBOT     3,434,488

CONTROLLING THE PROPORTIONING OF BLENDED FLUIDS

Filed March 16, 1965

Frank D. F. Talbot   Inventor

By Donald F. Woldus   Attorney

United States Patent Office 3,434,488
Patented Mar. 25, 1969

3,434,488
CONTROLLING THE PROPORTIONING OF BLENDED FLUIDS
Frank D. F. Talbot, Sarnia, Ontario, Canada, assignor to Esso Research and Engineering Company, a corporation of Delaware
Filed Mar. 16, 1965, Ser. No. 440,244
Int. Cl. G05d *11/16;* E03b *1/00*
U.S. Cl. 137—90
2 Claims

ABSTRACT OF THE DISCLOSURE

Liquids of different temperatures such as fuel oil and flux are blended by sensing the temperature of each, sensing the temperature of the blend, feeding these temperatures to a computer, and calculating the proper temperature for the blend desired. This computed blend temperature is then used by comparing it with actual instantaneous blend temperatures to reset or adjust the blend proportions.

---

The present invention relates to an improvement in controlling the proportioning of blended fluids. It pertains especially to control by blend temperature and, more particularly, by automatic control of the respective components making up the blend. This is done by using the temperature of the blend, when the temperatures of the several components also are known, to control the delivery or feed rates of one or more of the separate components.

By means of the present invention two or more fluids that are to be blended together, especially components having substantially different temperatures, may be continuously proportioned into a blend with accurate control by using the blend temperature as the control. Fluctuations in temperatures of the individual components are taken account of also, in a preferred arrangement, by continuously computing the blend temperature which should correspond to the desired proportions of the several components at their respective separate temperatures. This computed blend temperature is then used, e.g., by comparison with actual instantaneous blend temperature to reset or adjust the blend proportions. The latter function preferably is accomplished by use of a temperature controller of known type.

In the petroleum and chemical industries, there is a constant and widespread need for continuous control over the proportions of materials that are blended together. This is particularly true in the petroleum industry, where, for example, blends of heavy hydrocarbon fuels, diesel fuels, heating oils and the like are made up of at least two and frequently several components obtained from various sources. The materials to be blended are frequently brought together as flowing streams. They may come from various storage tanks or vessels, and from refinery streams, some of which may be very hot. In general, such components may be at widely varying temperatures although in some cases they also may be at nearly the same temperature. As long as there is substantial temperature difference between at least two components the composition of a blend of such components may be controlled quite accurately, according to the present invention, by merely adjusting the metering valve according to blend temperature.

To illustrate with a very simple application, assume first that a 50–50 blend is to be made of two components—one at 40° F. and the other at 280° F. Depending on the heat capacity of the different components, the temperature of the 50–50 blend may be somewhat about the median, that is, 160° F., or it may be somewhat different from this figure. In any case, by knowing the heat capacity and the instantaneous temperature of each of the constituents, and knowing the proposed proportions of the several components, while continuously noting their individual temperatures, a theoretical blend temperature may be calculated very accurately. This calculated value is compared continuously also with the actual temperatures of the blend. Where there is a difference, the metering valve or valves may be adjusted so that one or more of the components are fed at a newly adjusted rate and all brought together in the desired proportions. If the temperature of one of the components changes, the calculated blend temperature for a 50–50 blend, of course, changes. If actual blend temperature (instantaneous value) is different from the calculated value, one or more feed rates should be adjusted accordingly. The calculations are made continuously and automatically by a computer. The complexity of the computer will depend on the desired accuracy of the blend and also on the temperature differentials, as well as on the number of components to be blended.

Obviously, a two-component mixture presents a much more simple problem than a blend of three or more components. The invention normally deals with two-component blends. Nevertheless, the same principles may be applied to any reasonable number of components, provided there are enough temperature differences between all the individual components that accurate calculations of blend temperatures versus blend proportions can be used for the purposes of the present invention.

A particular object of the present invention is to simplify blending operations by making control of the blend proportioning directly subject to the blend temperature. This is preferably done by using a suitable computer for indicating the calculated value, and employing variations from this temperature for actuating means for resetting the blend metering valves as needed.

A particular object of the invention, therefore, is to make it possible to control proportions of components to be blended continuously, even when the components, or some of them, vary from time to time in temperature as is frequently the case, especially around oil refineries and blending plants.

Thus, a stream of a given hydrocarbon, for example, from a still, may come off the plant at a given elevated temperature. If it is promptly blended with other components of ordinary temperature this elevated temperature will be of importance in making sure that proportions are corerct. If the hot component is allowed to set into a tank first until it cools down, or if delivery is intermittent, or if there is a substantial change in the weather for materials in storage at more normal temperatures, the temperature of one or more components may change significantly. Nevertheless, the computer can still make desirable adjustments to keep the blend at the right proportions regardless of temperature, just as long as there is a substantial temperature difference between components.

It must be emphasized, of course, that the invention presupposes that there will be a substantial difference in temperature of the two or more liquid components blended since components blended at equal temperatures would not give any indication to control the proportions of blending.

This, however, does not greatly distract from utility of the invention since at least one of the components in many situations comes directly from a processing plant and has a temperature definitely different from the ambient temperature. Even in blending two or more materials in storage, some of them may be stored underground and some above ground, etc., or some may come in from pipeline, so that there may be a sufficient temperature differential to accomplish the purposes of the invention.

The invention will be more fully understood by consideration of specific examples; hence, reference will next be made to the drawings wherein.

Figure 1:
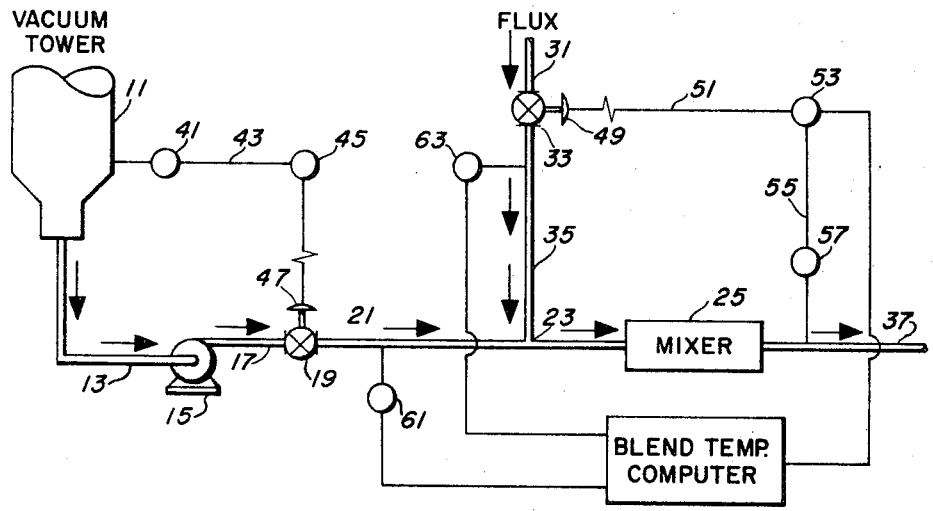
FIG. 1 shows an example of a blending operation where a heavy petroleum residual product, i.e., pitch bottoms from a vacuum tower are to be blended with a flux to produce a heavy fuel oil of widely used type.

Referring first to FIG. 1, there is shown a source of pitch, for example, the vacuum tower indicated at 11. The material in this tower will be at a fairly high temperature which may be of the order of 700° F., or even higher in many cases. The pitch flows from the bottom of the tower through a line 13 to a pump 15. From the pump it flows through a line 17 to the metering or proportioning valve 19 which is controlled in a manner to be hereafter described. From the valve 19 the fluid passes through line 21 to a blending point 23 and from thence into a mixer 25, which may be of any suitable type. Usually the mixing device will be provided with a stirring or mixing paddle structure to be sure that the components are well blended together.

Meanwhile, a flux or a light oil is supplied from another source at a much lower temperature, shown here at about 200° F. The flux comes through a line 31. This flux then passes through a metering or proportioning valve 33. Valve 33 also is controlled automatically in a manner to be described. From thence, the flux passes through a line 35 to the blending point 23. From there it passes into the mixer with the pitch and after blending the blended materials pass out of the mixer through line 37.

A level-sensing device 41 is installed in the vacuum tower to sense the level of the pitch therein. Through a line 43 a reading is taken to a controller LC, indicated at 45, which connects to the operating mechanism 47 of valve 19.

Likewise, the operating mechanism 49 for valve 33 connects through line 51 to a temperature controller 53. The latter connects by line 55 to a temperature-sensing element 57 in the blend line 37.

A temperature-sensing device 61 is provided in line 21 where the pitch from the pump approaches the blending point. A similar sensing device 63 is provided in line 35 where the flux approaches the blending point. This is done in order that an instantaneous temperature of the materials just before blending may be obtained constantly or at frequent intervals.

From the temperature-sensing devices 61 and 63, and also from temperature-sensing device 57, control lines are led to the several components of the computer and control system. Thus, from the temperature-sensing device 57 in the blend line the temperature controller 53 may be actuated under appropriate conditions to transmit an appropriate signal to the flux valve operating mechanism 49. Without any change in the flow from the vacuum tower, the proportion of flux will be adjusted, as determined by the temperature of the blend, to be sure that the correct amount of flux is being added at all times. The temperature of the pitch stream in line 21 is read into the blend temperature computer, as is also the temperature of the flux just before it reaches the blending point. On the basis of these readings, the temperature computer calculates the proper blend temperature and sets a value which the temperature controller should match. Any deviation in the actual blend temperature at line 37, as compared with the computed temperature, is transmitted in the form of a signal from device 57 to the temperature controller. The latter then will automatically change the setting of valve 33 through its operating mechanism 49. In this way, regardless of temperature variations at the vacuum tower or in the line 21 and also regardless of temperature variations of the flux in line 35, the computer will always have the correct blend temperature computed and available for comparison with the actual blend temperature reading at line 37 as transmitted to temperature recording device 57. As long as these two values agree, nothing will happen to change the valve setting. Should the actual blend temperature go up or down, as indicated at 57, the setting of valve 33 will be changed to supply the correct proportion of flux. It will be understood, of course, that the flow of either component may vary from time to time. For example, flux may be coming from a tank by gravity feed, which may require continual or periodic adjustment of valve 43, as the pressure-head on this liquid component varies from time to time. Similar factors may cause the flow rate from the pitch tank to vary.

Figure 2:
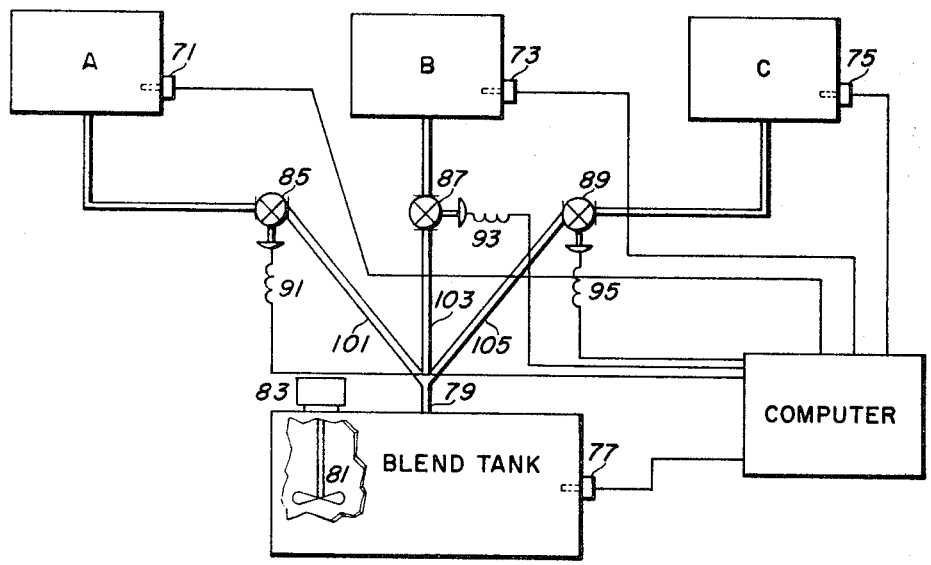
FIG. 2 shows diagrammatically the arrangement for blending a three-component mixture.

Referring now to FIG. 2, there is shown diagrammatically a three-component system wherein vessels A, B and C contain materials that are to be blended together in certain definite proportions. It will be assumed, for purposes of explanation, that the material in vessel A is at a high temperature, that in vessel B at a moderate temperature and that in vessel C at a low temperature.

A temperature-sensing device 71 indicates to the computer the temperature of the material in tank A. Likewise, a temperature-sensing device 73 in tank B and a device 75 in tank C transmit similar information to the computer.

A blend temperature-sensing device 77 is shown as being inserted in the blend tank which is relatively small. It might also be inserted in the blend line at point 79, if desired, as in FIG. 1. In some cases, particularly when the lines are large, the temperature may not be reliably equalized among the components in line 79 until they have flowed together for some distance. To insure mixing enough to get a reliable temperature reading in the blending tank a stirring device 81 is provided, driven by motor 83.

The blend temperature of the stirred material is sensed and transmitted or recorded. This, of course, is a delayed action type of blending and in some cases it may have but limited application. However, the principles are the same as in the system of FIG. 1. Valves 85, 87 and 89, respectively, in the outlet lines of tanks A, B and C are operated automatically by means of solenoid controls 91, 93 and 95. The latter, or at least two of them, are under control of the computer. Alternatively, they may be under temperature controller operation, the controller being in turn subject to guidance by the computer.

In FIG. 2, the three branch lines 101, 103 and 105 leading respectively from the valves 85, 87 and 89 are shown to converge at a single point. Hence, the three streams are blended substantially simultaneously. It is within the purview of the invention, however, to have two of the lines blend first and to sense the blending temperature at this point for controlling the blend of these particular components. Thereafter, this blend temperature, which is added at a later point, may be sensed and fed to the computer which then calculates the desired blend temperature at the new blend point. This value is then used for regulating the mixing rate of the respective components in the manner described in connection with FIG. 1. This system obviously may be extended as desired to the control of additional components, as many as may be required.

Normally, however, it is much simpler to keep the number of components of a blending operation to two or three. Other components may be added to some of the original components, by separate blending operations, or several may first be combined in conventional ways as a separate blend.

It will be understood that various modifications may be made which will suggest themselves to those skilled in the art without departing from the spirit and purpose of the invention. It is intended by the claims which follow to cover such variations and modifications as fully and broadly as the prior art properly permits.

What is claimed is:

1. A system for blending plural fluid components at different temperatures to produce a blend of a desired composition, said system comprising means for feeding a first component at a controlled rate, means for sensing the temperature of said first component, other means for feeding a second component at a separately controlled rate, means for sensing the temperature of said second component, means for blending the two components together, means for sensing the temperature of said blend, computer means for comparing the actual blend temperature with the blend temperature as computed on the basis of desired blend proportions, to ascertain whether the components have been blended in proper proportion and controller means responsive to said computer means for initiating an adjustment in the flow rate of at least one of said components when said actual blend temperature differs from said computed blend temperature.

2. System according to claim 1 wherein valve operating means are provided to change the flow rate of one of said components when the blend differs from the computed temperature, said valve operating means being responsive to said controller means.

References Cited

UNITED STATES PATENTS

| | | | |
|---|---|---|---|
| 933,577 | 9/1909 | Penniman | 236—12 |
| 2,072,384 | 3/1937 | Schmidt | 137—90 |
| 2,866,602 | 12/1958 | Dailey | 137—90 |
| 2,891,401 | 6/1959 | Heinrich | 137—90 |
| 3,029,829 | 4/1962 | Glueck | 137—3 |
| 3,250,218 | 5/1966 | Sinclair | 137—88 |

OTHER REFERENCES

Barnard, "ABC's of Multi-Element Control," February 1949, "Instruments," vol. 22, pp. 179–81.

ALAN COHAN, *Primary Examiner.*

WILLIAM H. WRIGHT, *Assistant Examiner.*

U.S. Cl. X.R.

137—3; 236—124